United States Patent
Sato et al.

(10) Patent No.: US 9,254,758 B2
(45) Date of Patent: Feb. 9, 2016

(54) CONTROL APPARATUS, VEHICLE, AND CONTROL METHOD

(71) Applicants: Hiroshi Sato, Nagoya (JP); Hiroaki Tabuchi, Okazaki (JP); Ken Koibuchi, Hadano (JP); Masato Chiba, Toyota (JP); Kazuhiko Sakakibara, Toyota (JP); Nobuyuki Okabe, Toyota (JP)

(72) Inventors: Hiroshi Sato, Nagoya (JP); Hiroaki Tabuchi, Okazaki (JP); Ken Koibuchi, Hadano (JP); Masato Chiba, Toyota (JP); Kazuhiko Sakakibara, Toyota (JP); Nobuyuki Okabe, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 304 days.

(21) Appl. No.: 14/043,102

(22) Filed: Oct. 1, 2013

(65) Prior Publication Data

US 2014/0091739 A1 Apr. 3, 2014

(30) Foreign Application Priority Data

Oct. 2, 2012 (JP) .................. 2012-220233

(51) Int. Cl.
*H02J 7/00* (2006.01)
*H02P 1/00* (2006.01)
*B60L 11/18* (2006.01)
*B60R 16/033* (2006.01)

(52) U.S. Cl.
CPC ........... *B60L 11/1879* (2013.01); *B60R 16/033* (2013.01)

(58) Field of Classification Search
CPC ...... Y02E 60/12; H02J 7/0004; H02J 7/0006; H01M 10/48; H01M 10/4257; Y02T 90/14; Y02T 10/7005; Y02T 90/128; Y02T 10/7088; Y02T 90/163; B60L 11/1879
USPC .................................. 320/106, 109; 318/139
See application file for complete search history.

(56) References Cited

U.S. PATENT DOCUMENTS

| 2004/0169489 A1* | 9/2004 | Hobbs ................... B60L 3/0046 320/104 |
| 2011/0231122 A1 | 9/2011 | Fabregas et al. |
| 2012/0049786 A1* | 3/2012 | Kurimoto .............. B60L 3/0046 320/106 |

FOREIGN PATENT DOCUMENTS

| DE | 102010062412 A1 | 9/2011 |
| JP | 05-300661 | 11/1993 |
| JP | 2001-173480 A | 6/2001 |
| JP | 2009-208639 A | 9/2009 |
| JP | 2012-050267 A | 3/2012 |
| JP | 2012-112286 A | 6/2012 |
| JP | 2012-136950 A | 7/2012 |

* cited by examiner

*Primary Examiner* — Richard Isla Rodas
*Assistant Examiner* — Mohammed J Sharief
(74) *Attorney, Agent, or Firm* — Kenyon & Kenyon LLP

(57) ABSTRACT

A control apparatus for a vehicle having an idle stop function includes a measurement unit that measures the characteristic of a battery provided in the vehicle, an identification unit that identifies the type of the battery based on the measured characteristic, and a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle.

6 Claims, 7 Drawing Sheets

CONTROL APPARATUS, VEHICLE, AND CONTROL METHOD

INCORPORATION BY REFERENCE

The disclosure of Japanese Patent Application No. 2012-220233 filed on Oct. 2, 2012 including the specification, drawings and abstract is incorporated herein by reference in its entirety.

BACKGROUND OF THE INVENTION

1. Field of the Invention

The invention relates to a technique for controlling a vehicle having an idle stop function.

2. Description of Related Art

In recent years, in order to achieve low fuel consumption of a vehicle, an idle stop (also referred to as idle reduction) technique is widely used. With regard to a technique for performing the idle stop, for example, Japanese Patent Application Publication No. 2009-208639 (JP-2009-208639 A) discloses a technique in which the type of a battery provided in a vehicle is identified based on characteristics of the battery and, in a case where it is determined that the battery different from a battery for an idle-stop vehicle is provided in the vehicle, the execution of the idle stop is prohibited.

However, in the technique disclosed in JP-2009-208639 A, even in a case where the battery for the idle-stop vehicle is erroneously identified as a normal battery due to some cause, the execution of the idle stop is prohibited. As a result, there are cases where the idle stop function cannot be properly executed even when the battery for the idle-stop vehicle is provided in the vehicle. Therefore, a technique that allows proper execution of the idle stop function in the vehicle having the idle stop function is in demand. In addition, in conventional vehicles, proper determination of battery replacement, simplification of a configuration, a reduction in cost, and an improvement in usability are in demand.

SUMMARY OF THE INVENTION

The invention provides a vehicle having the idle stop function that properly determines that the battery has been replaced.

A first aspect of the invention provides a control apparatus for a vehicle having an idle stop function. The control apparatus includes a measurement unit that measures a characteristic of a battery provided in the vehicle, an identification unit that identifies a type of the battery based on the measured characteristic, and a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle. According to the control apparatus having such a configuration, as a result of the identification of the type of the battery, even when the identified type indicates that the battery is not for the idle-stop vehicle, in the case where the predetermined signal is inputted from the external terminal, the execution of the idle stop function is permitted. In the control apparatus according to the first aspect of the invention, even in a case where the mounted battery is erroneously identified as the battery that is not for the idle-stop vehicle even when the battery for the idle-stop vehicle is provided in the vehicle, it is possible to normally execute the idle stop function by connecting the vehicle and the external terminal. Therefore, it becomes possible to enhance the convenience of a user.

In the control apparatus described above, the identification unit may identify the type of the battery in a case where replacement of the battery is detected. In the control apparatus described above, since the type of the battery is identified in a case where the battery has been replaced, it is possible to properly determine whether or not the execution of the idle stop function is permitted according to the type of the battery obtained as a result of the replacement.

The control apparatus described above may further include a volatile memory in which a stored content is retained using the battery and, even in a case where the stored content in the memory is not initialized, the identification unit may determine that the battery has been replaced in a case where the characteristic of the battery is changed during a predetermined time period. In the control apparatus described above, even when the battery is replaced while the stored content in the memory is retained, it is possible to properly determine that the battery has been replaced.

The control apparatus described above may further include a volatile memory in which a stored content is retained using the battery and, even in a case where it is detected that the stored content in the memory is initialized, the identification unit may determine that the battery has not been replaced in a case where the characteristic of the battery remains unchanged even after the initialization. In the control apparatus described above, for example, in a case where a cable for connecting the battery to the control apparatus is cut due to some cause and the battery is re-connected to the control apparatus thereafter, it is possible to prevent an erroneous determination that the battery has been replaced.

The invention can be implemented in various aspects in addition to the control apparatus described above. For example, the invention can be implemented in aspects such as a vehicle having the idle stop function, a control method for the vehicle having the idle stop function, and an external terminal connected to the vehicle having the idle stop function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
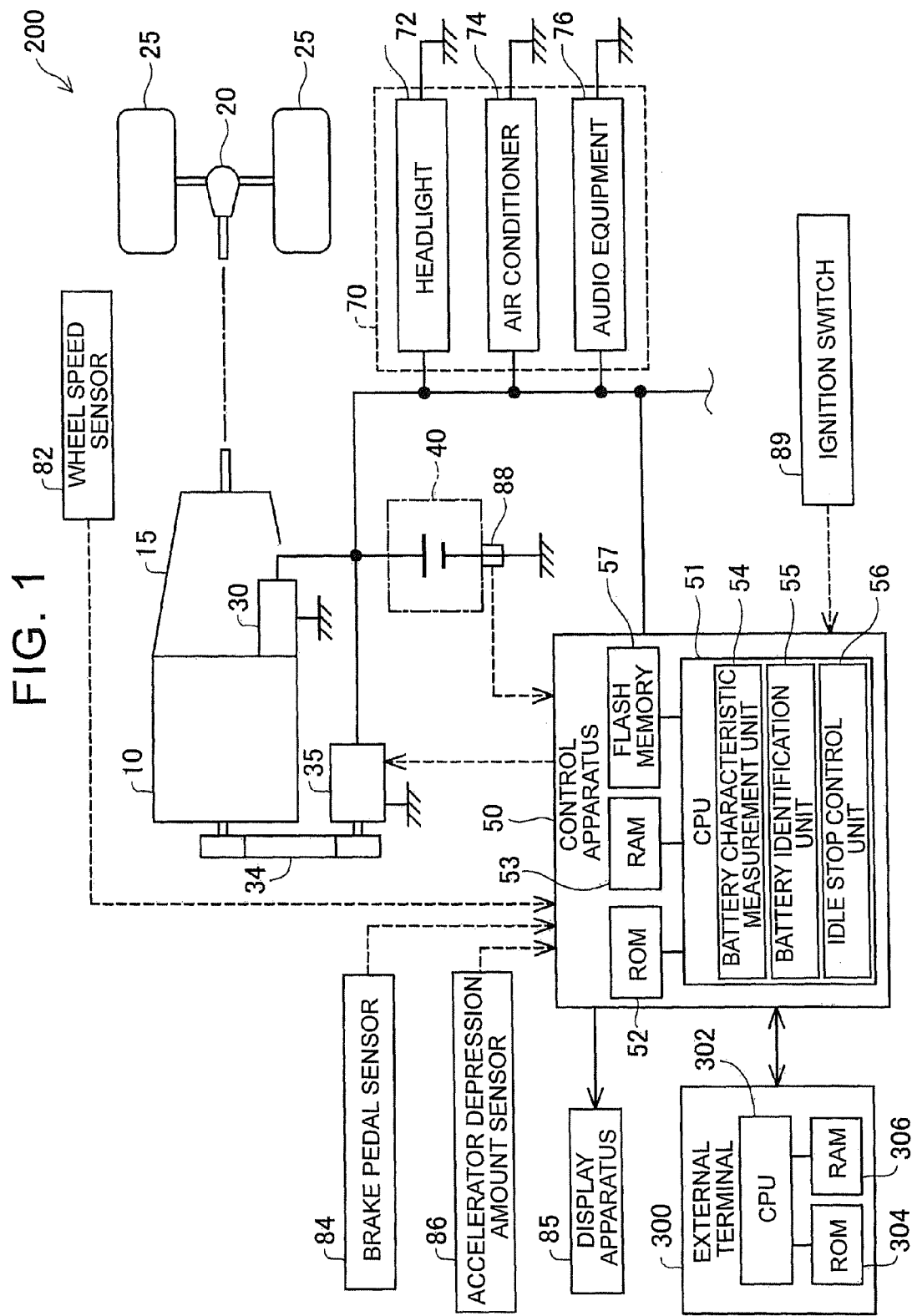
FIG. 1 is an explanatory view showing the configuration of an automobile according to the present embodiment.

FIG. 1 is an explanatory view showing the configuration of an automobile 200 according to the present embodiment. The automobile 200 is a vehicle having an idle stop function. The automobile 200 includes an engine 10, an automatic transmission 15, a differential gear 20, drive wheels 25, a starter 30, an alternator 35, a battery 40, and a control apparatus 50.

The engine 10 is an internal combustion engine that generates power by combusting fuel such as gasoline and light oil. The power of the engine 10 is transmitted to the automatic transmission 15, and is also transmitted to the alternator 35 via a drive mechanism 34. The output of the engine 10 is changed by the control apparatus 50 in accordance with the depression amount of an accelerator pedal (not shown) operated by a driver.

The automatic transmission 15 automatically executes change of a speed ratio (what is called shift change). The power (RPM·torque) of the engine 10 is changed by the automatic transmission 15, and is transmitted to the right and left drive wheels 25 as a desired RPM and a desired torque via the differential gear 20. In this manner, the power of the engine 10 is transmitted to the drive wheels 25 via the automatic transmission 15 while being changed in accordance with the depression amount of the accelerator pedal, and the acceleration and deceleration of the vehicle (the automobile 200) are thereby performed.

In the present embodiment, the drive mechanism 34 that transmits the power of the engine 10 to the alternator 35 adopts the configuration of a belt drive system. The alternator 35 generates electric power by using a part of the power of the engine 10. The generated electric power is used to charge the battery 40 via an inverter (not shown).

The battery 40 is a lead storage battery as a direct current (DC) power source, and supplies electric power to peripheral equipment provided outside the engine main body. In the present specification, equipment that is the peripheral equipment provided outside the engine main body and operates by using electric power of the battery 40 is referred to as "auxiliary equipment". In addition, a group of the auxiliary equipment is referred to as an "auxiliary equipment group". The automobile 200 includes a headlight 72, an air conditioner 74, and audio equipment 76 as the auxiliary equipment group 70.

The starter 30 is a starter motor that starts the engine 10 using electric power supplied from the battery 40. In a case where the operation of the stopped automobile is started, when the driver operates an ignition switch 89, the starter 30 is activated and the engine 10 is started. The starter 30 is used also in a case where the engine 10 is restarted from its idle stop state.

The control apparatus 50 is constituted as a computer that includes a central processing unit (CPU) 51, a read only memory (ROM) 52, a random access memory (RAM) 53, a flash memory 57, and input/output ports. To the input/output ports, there are connected various sensors, the starter 30, the alternator 35, and the ignition switch 89. As the sensors connected to the input/output ports, there are provided a wheel speed sensor 82 that detects the RPM of the drive wheels 25, a brake pedal sensor 84 that detects whether or not a brake pedal is depressed, an accelerator depression amount sensor 86 that detects the depression amount of the accelerator pedal as an accelerator depression amount, and a battery sensor 88 that detects the voltage, current, and temperature of the battery 40.

The RAM 53 is a volatile memory, and the stored content therein is retained by the supply of electric power from the battery 40. Consequently, when the connection between the battery 40 and the control apparatus 50 is disconnected, data (e.g., learning data for correcting the control map of the engine 10) stored in the RAM 53 is initialized. The initialization of data in the RAM 53 caused by detaching the battery 40 from the automobile 200 is also referred to as "battery clear".

The CPU 51 loads a computer program stored in the ROM 52 into the RAM 53 and executes the computer program to thereby function as a battery characteristic measurement unit 54, a battery identification unit 55, and an idle stop control unit 56. The battery characteristic measurement unit 54 corresponds as "measurement unit", the battery identification unit 55 functions as "identification unit", and the idle stop control unit 56 functions as "control unit".

The battery characteristic measurement unit 54 measures characteristics of the battery 40 by using the battery sensor 88. Specifically, the battery characteristic measurement unit 54 measures the voltage, current, temperature, internal resistance, capacity, charge acceptance, and state of charge (SOC) of the battery 40 as the characteristics of the battery 40. The internal resistance, capacity, charge acceptance, and SOC can be calculated by using the voltage, current, and temperature.

The battery identification unit 55 identifies the type of the battery 40 based on the characteristics of the battery 40 measured by the battery characteristic measurement unit 54. In the present embodiment, the battery identification unit 55 determines whether the battery 40 is a battery for an idle-stop vehicle or a normal battery that is not for the idle-stop vehicle. In the following, the former is referred to as a "specified battery", and the latter is referred to as a "non-specified battery". The battery identification unit 55 is capable of displaying the identification result of the battery 40 on, e.g., a display apparatus 85.

The idle stop control unit 56 performs the control of the idle stop function that stops the engine 10 when the automobile 200 is in an idling state. The idle stop control is a conventional technique, and hence the detailed description thereof will be omitted. In the present embodiment, in a case where the type of the battery 40 identified by the battery identification unit 55 indicates the "non-specified battery", the idle stop control unit 56 stops the idle stop function. This is because, in the case of the non-specified battery, there is a possibility that the battery capacity becomes insufficient, and it becomes impossible to supply electric power to the auxiliary equipment group during the idle stop. In addition, in a case where the execution of the idle stop function is permitted by inputting a predetermined signal (hereinafter referred to as a "forcible permission signal") from an external terminal 300 described later, the idle stop control unit 56 permits the execution of the idle stop function irrespective of the identification result of the type of the battery 40. This arrangement is made in order to forcibly allow the execution of the idle stop function in a case where the battery identification unit 55 erroneously determines that the non-specified battery is provided in the vehicle even when the specified battery is provided in the vehicle.

The external terminal 300 is an apparatus provided at a car dealer or the like, and can connected to and communicate with the control apparatus 50. The external terminal 300 and the control apparatus 50 may be connected to each other wirelessly or through wire. The external terminal 300 is also referred to as a "diagnostic tester". The external terminal 300 is constituted as a computer that includes a CPU 302, a ROM 304, and a RAM 306. When the control apparatus 50 and the external terminal 300 are connected to each other, it is possible to read and display the stored content of the RAM 53 of the control apparatus 50 by the external terminal 300. In addition, it is possible to issue various commands to the control apparatus 50 from the external terminal 300. In the present embodiment, in a case where the external terminal 300 accepts a predetermined operation from a user (mechanic), the external terminal 300 outputs the forcible permission signal to the control apparatus 50. When the control apparatus 50 receives the forcible permission signal from the external terminal 300, the control apparatus 50 writes information indicative of the reception of the forcible permission signal into the RAM 53.

Figure 2:
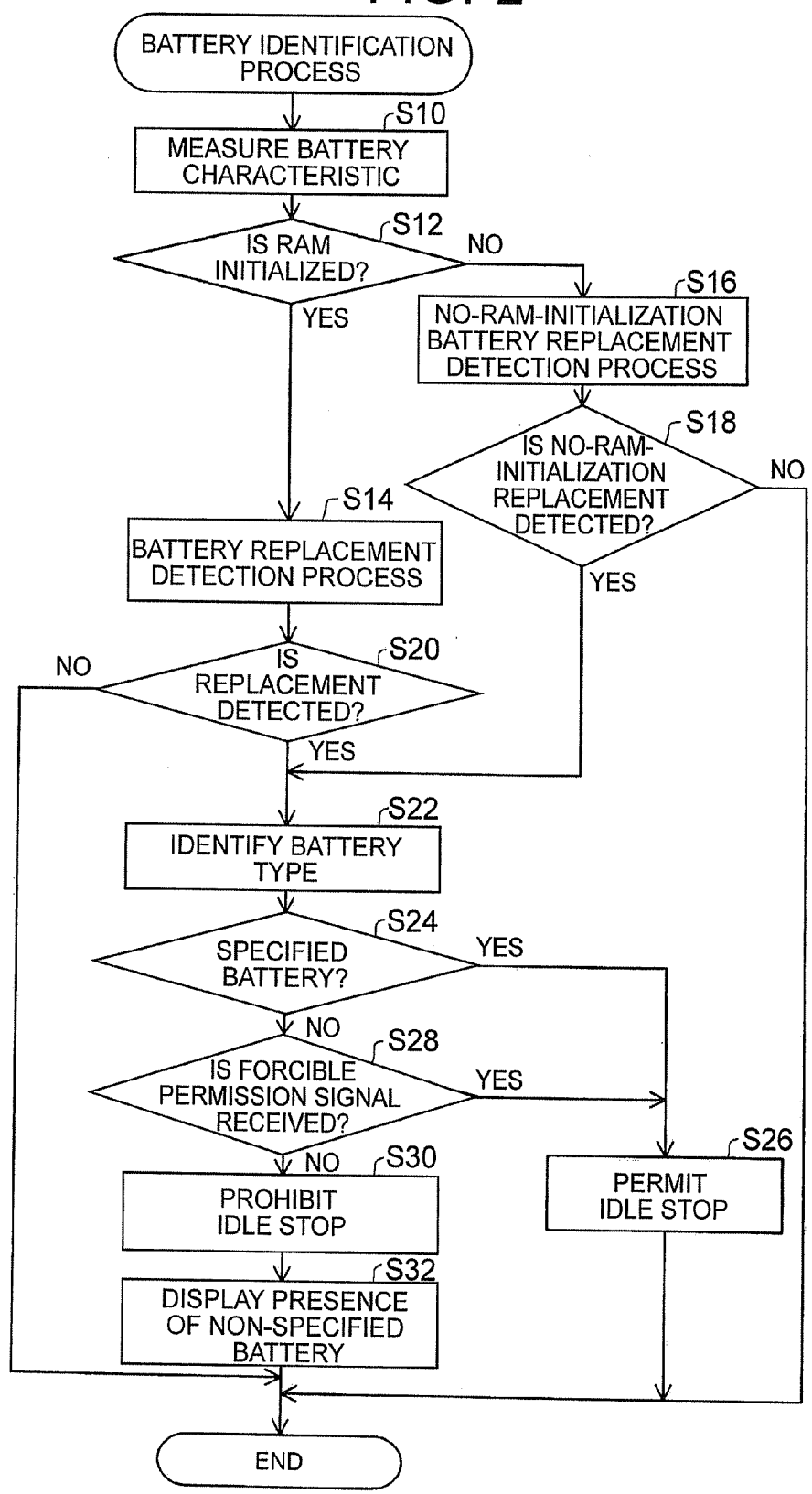
FIG. 2 is a flowchart of a battery identification process.

FIG. 2 is a flowchart of a battery identification process executed by the control apparatus 50. This battery determination process is a process for identifying the type of the battery 40 provided in the automobile 200 and determining whether or not the execution of the idle stop function is permitted according to the identification result. The battery identification process is executed every time the ignition switch 89 is turned ON.

When the battery identification process is executed, first, the battery characteristic measurement unit 54 measures the characteristics of the battery 40 by using the battery sensor 88 (step S10). In step S10, as the characteristics of the battery 40, the battery characteristic measurement unit 54 measures the voltage, current, temperature, internal resistance, and capacity. The battery characteristic measurement unit 54 writes the measurement result into the flash memory 57.

Subsequently, the battery identification unit 55 determines whether or not the RAM 53 is initialized (i.e., whether or not the battery clear is performed) (step S12). In a case where the battery identification unit 55 determines that the RAM 53 is initialized, the battery identification unit 55 further detects whether or not the battery 40 has been replaced based on the characteristics of the battery 40 measured in step S10 (step S14). This step is necessary because there are cases where the battery 40 is not actually replaced even when the RAM 53 is initialized. Hereinbelow, the process in step S14 is referred to as a "battery replacement detection process".

Figure 3:
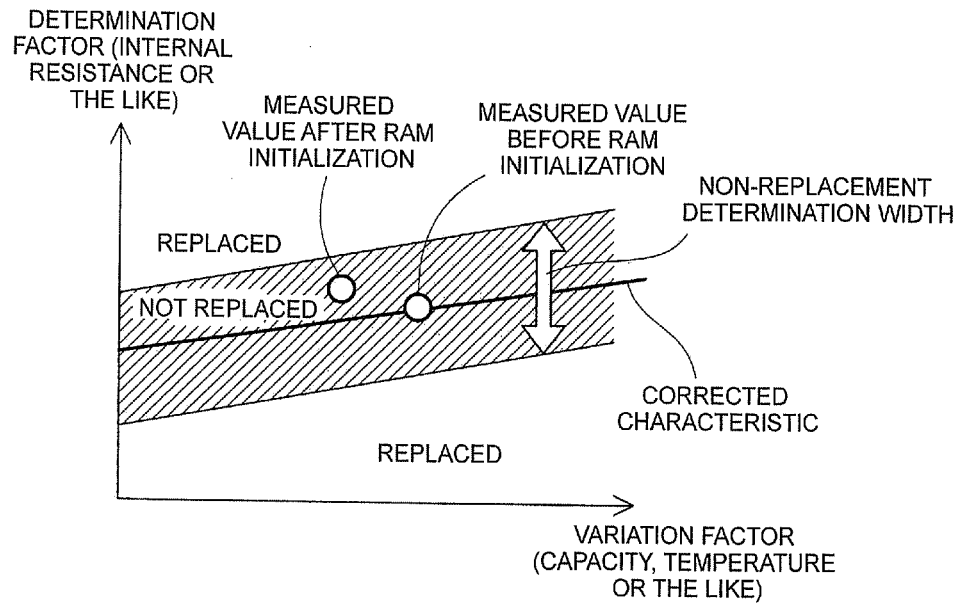
FIG. 3 is a view for explaining the detail of a battery replacement detection process.

FIG. 3 is a view for explaining the detail of the battery replacement detection process. The vertical axis of a graph shown in FIG. 3 indicates the value of a determination factor for determining whether not the battery 40 has been replaced, while the horizontal axis thereof indicates the value of a variation factor. In the present embodiment, as the determination factor, the internal resistance of the battery 40 is used. Examples of the variation factor that causes variations of the determination factor (the internal resistance) include the capacity and the temperature of the battery 40. The battery characteristic measurement unit 54 reads the internal resistance of the battery 40 stored in the flash memory 57 before the RAM 53 is initialized, and calculates a value obtained by correcting the value of the internal resistance according to the variation factor (hereinafter referred to as a "corrected characteristic"). When the corrected characteristic is calculated, the battery characteristic measurement unit 54 determines the width of the internal resistance with which it can be determined that the battery 40 has not been replaced (hereinafter referred to as a "non-replacement determination width") by using the corrected characteristic as the center of the width thereof. Then, it is determined whether or not the internal resistance of the battery 40 measured in step S10 described above after the RAM 53 is initialized falls within the non-replacement determination width. As shown in FIG. 3, when the internal resistance of the battery 40 falls within the non-replacement determination width, the battery identification unit 55 determines that the battery 40 has not been replaced. On the other hand, when the currently measured internal resistance does not fall within the non-replacement determination width, the battery identification unit 55 determines that the battery 40 has been replaced.

Figure 4:
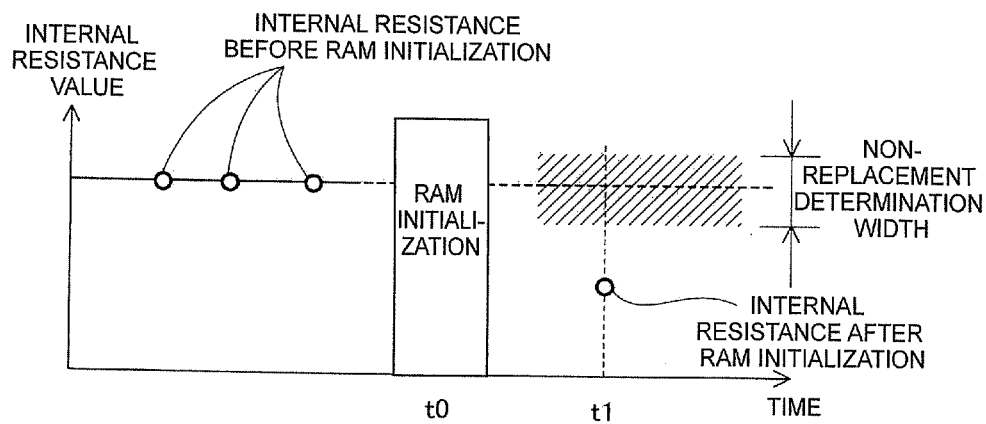
FIG. 4 is a view showing the flow of the battery replacement detection process.

FIG. 4 is a view showing the flow of the battery replacement detection process. In step S10 described above, every time the ignition switch 89 is turned ON, the battery characteristic measurement unit 54 calculates the internal resistance of the battery 40, and stores the internal resistance thereof in the flash memory 57. Subsequently, in a case where the RAM 53 is initialized at a given timing t0 (step S12 described above: YES), thereafter, by the execution of step S14 at a timing t1, the non-replacement determination width is determined based on the previously measured internal resistance, and it is determined whether or not the battery 40 has been replaced according to whether or not the currently measured value of the internal resistance falls within the non-replacement determination width. FIG. 4 shows an example in which the internal resistance of the battery 40 significantly fluctuates after the initialization of the RAM 53. In this case, since the internal resistance of the battery 40 is not within the non-replacement determination width, it is detected that the battery 40 has been replaced in step S14 described above.

In step S12 described above, in a case where it is determined that the RAM 53 is not initialized, the battery identification unit 55 detects whether or not the battery 40 has been replaced without the initialization of the RAM 53 (step S16). This step is necessary because there are cases where some users replace the battery 40 while backing up the RAM 53 using a dry battery or the like so that, even when the RAM 53 is not initialized, there are cases where the battery is replaced. Hereinafter, the process in step S16 is referred to as a "no-RAM-initialization battery replacement detection process".

Figure 5:
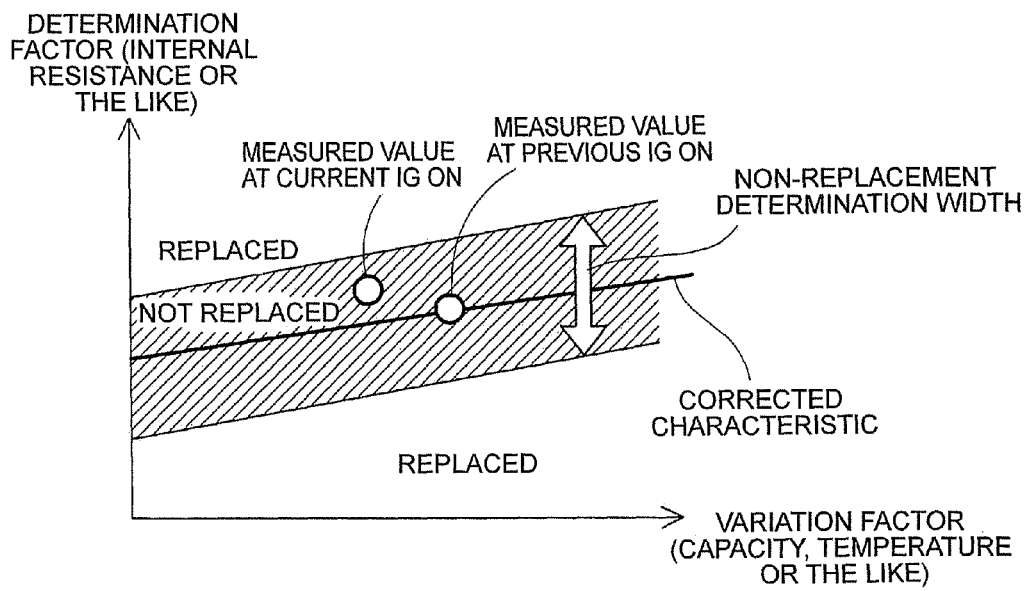
FIG. 5 is a view for explaining the detail of a no-RAM-initialization battery replacement detection process.

FIG. 5 is a view for explaining the detail of the no-RAM-initialization battery replacement detection process. The vertical axis of a graph shown in FIG. 5 indicates the value of the determination factor for determining whether or not the battery 40 has been replaced, while the horizontal axis thereof indicates the value of the variation factor. In the present embodiment, as the determination factor, the internal resistance of the battery 40 is used. Examples of the variation factor that causes variations of the determination factor (the internal resistance) include the capacity and the temperature of the battery 40. The battery characteristic measurement unit 54 reads the internal resistance of the battery 40 recorded in the flash memory 57 at the previous ignition ON, and calculates a value (hereinafter referred to as a "corrected characteristic") obtained by correcting the value of the internal resistance according to the variation factor. When the corrected characteristic is calculated, the battery characteristic measurement unit 54 determines the width of the internal resistance with which it can be determined that the battery 40 has not been replaced (hereinafter referred to as a "non-replacement determination width") by using the corrected characteristic as the center of the width thereof. Then, at the current ignition ON, it is determined whether or not the internal resistance of the battery 40 measured in step S10 described above falls within the non-replacement determination width. As shown in FIG. 5, when the internal resistance of the battery 40 falls within the non-replacement determination width, the battery identification unit 55 determines that the battery 40 has not been replaced. On the other hand, when the currently measured internal resistance does not fall within the non-replacement determination width, the battery identification unit 55 determines that the battery 40 has been replaced.

Figure 6:
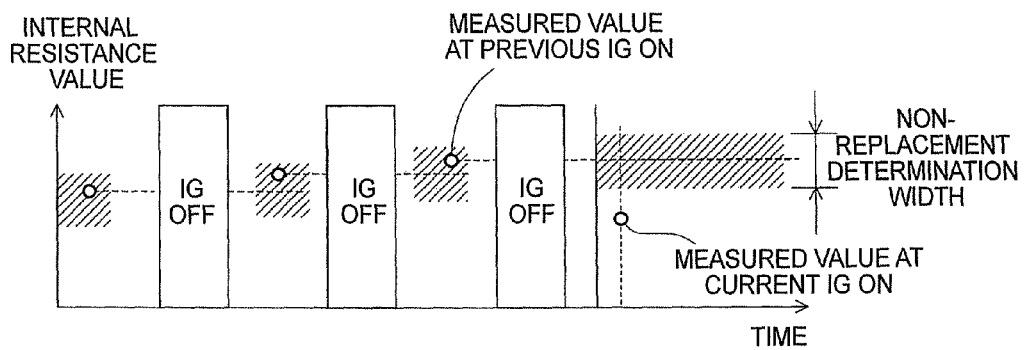
FIG. 6 is a view showing the flow of the no-RAM-initialization battery replacement detection process.

FIG. 6 is a view showing the flow of the no-RAM-initialization battery replacement detection process. In step S10 described above, every time the ignition switch 89 is turned ON, the battery characteristic measurement unit 54 calculates the internal resistance of the battery 40, and records the internal resistance in the flash memory 57. Subsequently, in a case where the ignition switch 89 is turned ON and it is determined that the RAM 53 is not initialized in step S12 described above (step S12 described above: NO), thereafter, by the execution of step S16 described above, the non-replacement determination width is determined based on the previously measured internal resistance, and it is determined whether or not the battery 40 has been replaced according to whether or not the currently measured value of the internal resistance falls within the non-replacement determination width. FIG. 6 shows an example in which the internal resistance of the battery 40 significantly fluctuates at the current ignition ON. In this case, since the internal resistance of the battery 40 is not within the non-replacement determination width, in step S16 described above, it is detected that the battery 40 has been replaced.

When it is detected that the battery 40 has not been replaced in the battery replacement detection process in step S14 described above (step S20: NO), the control apparatus 50 ends the battery identification process. In addition, also in a case where it is detected that the battery 40 has not been replaced in the no-RAM-initialization battery replacement detection process in step S16 described above (step S18: NO), the control apparatus 50 ends the battery identification process. On the other hand, in a case where it is detected that the battery 40 has been replaced in the battery replacement detection process in step S14 (step S20: YES), the battery identification unit 55 identifies the type of the battery based on the characteristics of the battery 40 (step S22). In addition, also in a case where it is detected that the battery 40 has been replaced in the no-RAM-initialization battery replacement detection process in step S16 (step S18: YES), the battery identification unit 55 identifies the type of the battery based on the characteristics of the battery 40 (step S22).

Figure 7:
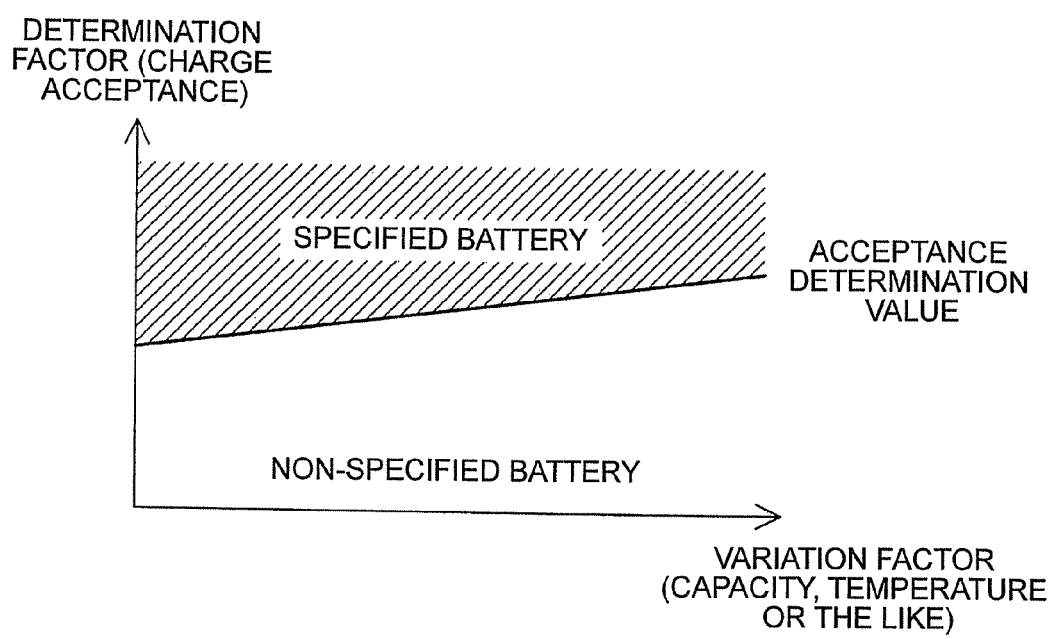
FIG. 7 is a view for explaining a method for identifying the type of a battery.

FIG. 7 is a view for explaining a method for identifying the type of the battery 40. The vertical axis of a graph shown in FIG. 7 indicates the value of the determination factor for identifying the type of the battery 40, while the horizontal axis thereof indicates the variation factor. In the present embodiment, as the determination factor, the charge acceptance (charge recovery capability) of the battery 40 is used. Examples of the variation factor include the capacity and the temperature of the battery 40. In step S22 described above, the battery characteristic measurement unit 54 measures the charge acceptance of the battery 40, and the battery identification unit 55 compares the measured charge acceptance of the battery 40 with an acceptance determination value pre-set according to the variation factor, and determines that the type of the battery 40 indicates the specified battery when the charge acceptance is larger than the acceptance determination value. On the other hand, when the charge acceptance is smaller than the acceptance determination value, the battery identification unit 55 determines that the type of the battery 40 indicates the non-specified battery.

Figure 8:
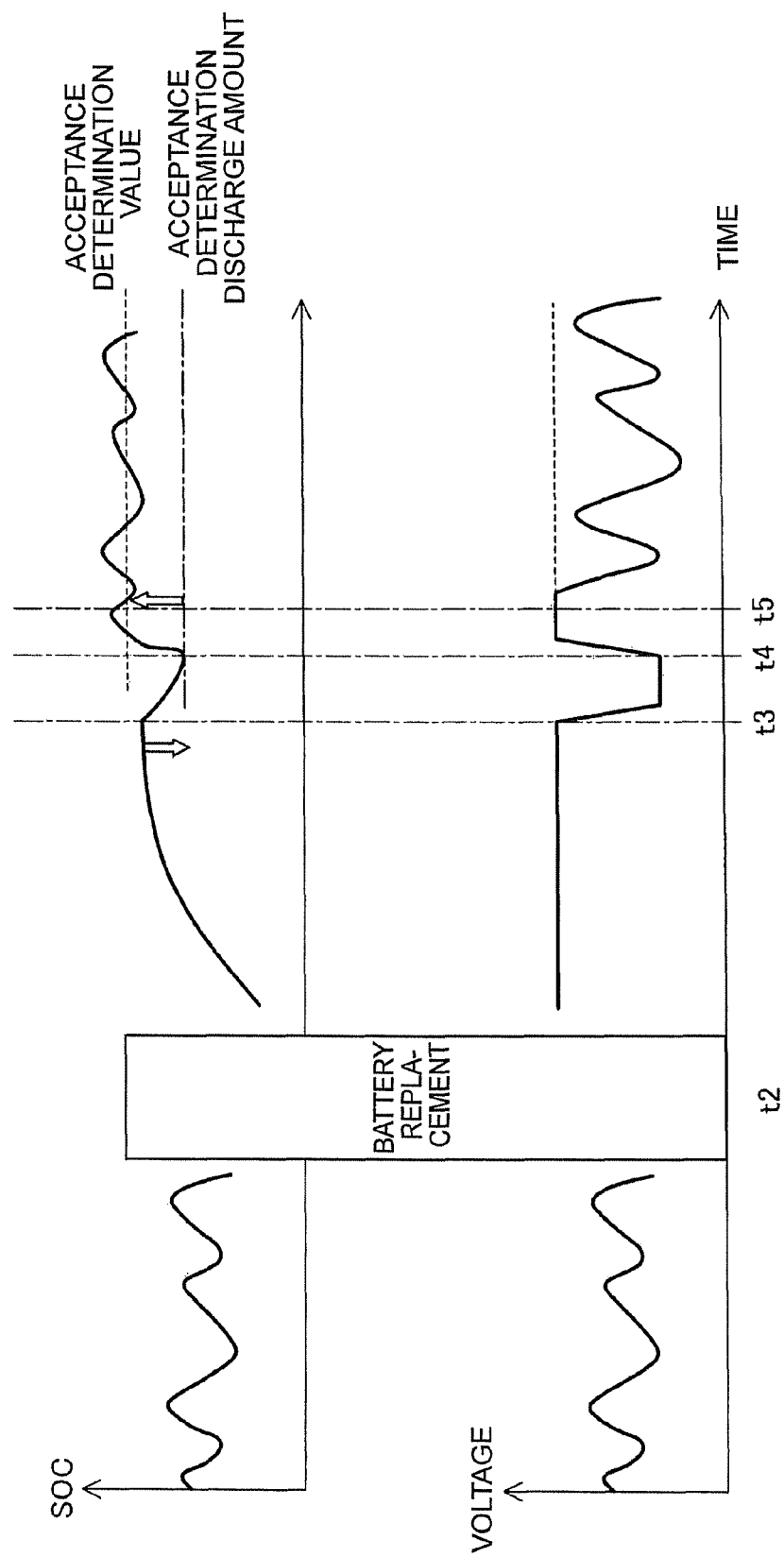
FIG. 8 is a view showing the flow of the identification of the type of the battery.

FIG. 8 is a view showing the flow of the identification of the type of the battery. The upper graph shows the change of the SOC of the battery 40, while the lower graph shows the change of the voltage of the battery 40. In step S14 described above or step S16 described above, when it is detected that the battery 40 has been replaced, first, the battery characteristic measurement unit 54 applies a predetermined voltage to the battery 40 to cause the battery 40 to be fully charged and, at a timing t3 after the battery 40 is fully charged, causes the battery 40 to be discharged by a predetermined discharge amount (an "acceptance determination discharge amount" in the drawing), whereby variations of the SOC of the battery 40 are eliminated. In this manner, when the variations of the SOC are eliminated, the battery characteristic measurement unit 54 causes the battery 40 to be charged again at a timing t4, and measures the SOC at a timing t5 after the elapse of a certain period of time. The change amount of the measured SOC from the timing t4 to the timing t5, or a charging current total amount from the timing t4 to the timing t5 represents the charge acceptance. In a case where the charge acceptance measured in this manner is larger than the acceptance determination value (FIG. 7) set according to the variation factor, the battery identification unit 55 determines that the type of the battery 40 indicates the specified battery. On the other hand, in a case where the charge acceptance is smaller than the acceptance determination value, the battery identification unit 55 determines that the type of the battery 40 indicates the non-specified battery.

In step S22 described above, in a case where it is determined that the type of the battery 40 indicates the specified battery (step S24: YES), the idle stop control unit 56 permits the idle stop function, and also permit a charging control involved in the idle stop function (step S26). On the other hand, in step S22, in a case where it is determined that the type of the battery 40 indicates the non-specified battery (step S24: NO), the idle stop control unit 56 determines whether or not the forcible permission signal is received from the external terminal 300 (step S28). It is possible to determine whether or not the forcible permission signal is received from the external terminal 300 based on whether or not the information indicative of the reception of the forcible permission signal is written in the RAM 53.

In a case where the forcible permission signal is received from the external terminal 300 (step S28: YES), the idle stop control unit 56 forcibly permits the idle stop function even when the type of the battery 40 identified in step S22 indicates the non-specified battery (step S26). On the other hand, in a case where the forcible permission signal is not received from the external terminal 300 (step S28: NO), the idle stop control unit 56 prohibits the idle stop function and also prohibits the charging control involved in the idle stop function (step S30), and displays information indicative of the mounting of the non-specified battery on the display apparatus 85 (step S32). When the battery identification process described above is ended, the control apparatus 50 performs the operation control of the automobile 200 according to the permission or prohibition of the idle stop function determined by the battery identification process.

According to the automobile 200 of the present embodiment described thus far, after the result of the identification of the type of the battery 40, even when the identified type of the battery 40 indicates the non-specified battery, in the case where the forcible permission signal is received from the external terminal 300, the idle stop function is forcibly permitted. Consequently, even in a case where the battery is erroneously identified as the non-specified battery even when the specified battery is provided due to its deterioration with age or the like, it is possible to normally execute the idle stop function by bringing the automobile 200 to a car dealer or the like where the external terminal 300 is provided. Therefore, it becomes possible to enhance the convenience of the user.

In addition, according to the present embodiment, even when the RAM 53 is initialized, in a case where the characteristic of the battery 40 remains unchanged even after the initialization thereof, it is determined that the battery 40 has not been replaced. Therefore, for example, in a case where the cable for connecting the battery 40 to the control apparatus 50 is cut due to some cause, and the battery 40 is re-connected to the control apparatus 50 thereafter, it is possible to prevent an erroneous determination that the battery 40 has been replaced.

Further, according to the present embodiment, even when the RAM 53 is not initialized, in a case where the characteristic of the battery 40 at the current ignition ON is changed from that at the previous ignition ON, it is determined that the battery 40 has been replaced. Therefore, in a case where the battery 40 has been replaced without the initialization of the RAM 53, it is possible to properly detect that the battery 40 has been replaced.

Furthermore, according to the present embodiment, in a case where the mounted battery 40 is identified as the non-specified battery, the information indicative of the mounting of the non-specified battery is displayed on the display apparatus 85. Therefore, the user can easily recognize an erroneous determination that the non-specified battery is provided in the vehicle when the specified battery is provided in the vehicle.

In the embodiment described above, the type of the battery 40 is identified based on the charge acceptance of the battery 40. However, the determination factor of the type of the battery 40 is not limited to the charge acceptance. For example, it is possible to identify the type of the battery 40 by using the internal resistance of the battery 40.

Figure 9:
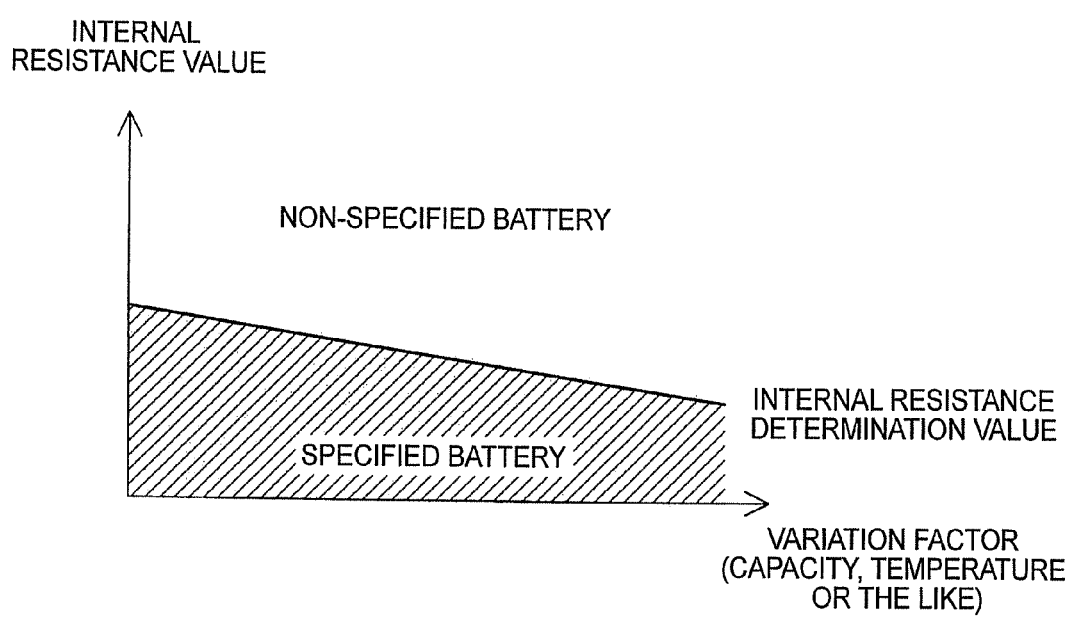
FIG. 9 is a view for explaining a method for identifying the type of the battery based on an internal resistance.

FIG. 9 is a view for explaining a method for identifying the type of the battery 40 based on the internal resistance. The vertical axis of a graph shown in FIG. 9 indicates the value of the determination factor (the internal resistance) for identifying the type of the battery 40, while the horizontal axis thereof indicates the variation factor. Examples of the variation factor include the capacity and the temperature of the battery 40. The battery identification unit 55 compares the internal resistance value of the battery 40 measured in step S10 of FIG. 2 with an internal resistance determination value pre-set according to the variation factor, and determines that the type of the battery 40 indicates the specified battery when the internal resistance value is smaller than the internal resistance determination value. On the other hand, when the internal resistance value is larger than the internal resistance determination value, the battery identification unit 55 determines that the type of the battery 40 indicates the non-specified battery.

In the embodiment described above, in the battery replacement detection process and the no-RAM-initialization battery replacement detection process, it is determined whether or not the battery 40 has been replaced based on the change of the internal resistance value of the battery 40. However, it may be determined whether or not the battery 40 has been replaced based on the change of the charge acceptance of the battery 40 or the capacity thereof.

In the embodiment described above, in the case where the replacement of the battery 40 is detected, the type of the battery 40 is identified and the idle stop function is permitted or prohibited. In contrast to this, irrespective of the replacement of the battery 40, the type of the battery 40 may be identified and the idle stop function may be permitted or prohibited.

In the embodiment described above, in the case where the battery 40 is identified as the non-specified battery, the idle stop function is prohibited. In contrast to this, even in the case where the battery 40 is identified as the non-specified battery, the execution of the idle stop function may be allowed within the ranges of the SOC and frequency that do not affect the life of the battery 40. In addition, for example, instead of inevitably prohibiting the idle stop function when the non-specified battery is provided, by setting the determination value of the characteristic value that permits the idle stop function to a value on a higher-performance side, the idle stop function may be executed in a case where a high-performance non-specified battery is provided.

In the embodiment described above, after the detection of the battery replacement and the identification of the type of the battery are performed, it is determined whether or not the forcible permission signal is received and, when the forcible permission signal is received, the execution of the idle stop function is permitted. In contrast to this, in the case where the forcible permission signal is received, the execution of the idle stop function may be permitted without performing the detection of the battery replacement or the identification of the type of the battery. That is, in the case where the forcible permission signal is received from the external terminal 300, the execution of the idle stop function may be permitted irrespective of the detection result of the battery replacement and the identification result of the type of the battery.

The invention is not intended to be limited to the above embodiment or modification, and can be implemented in various configurations without departing from the gist thereof. For example, embodiments corresponding to technical features in aspects described in the section of SUMMARY OF THE INVENTION and technical features in modifications can be appropriately replaced or combined in order to solve a part or all of the above problems or achieve a part of all of the above effects. In addition, unless the technical features are not described as essential technical features in the present specification, the technical features can be appropriately deleted.

What is claimed is:

1. A control apparatus for a vehicle having an idle stop function, comprising:
    a volatile memory in which a stored content is retained using a battery provided in the vehicle;
    a measurement unit that measures a characteristic of the battery provided;
    an identification unit that identifies a type of the battery based on the measured characteristic of the battery; and
    a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle, wherein
    the identification unit identifies the type of the battery in a case where replacement of the battery is detected, and
    even in a case where the stored content in the memory is not initialized, the identification unit determines that the battery has been replaced in a case where the characteristic of the battery is changed during a predetermined time period.

2. A control apparatus for a vehicle having an idle stop function, comprising:
    a volatile memory in which a stored content is retained using the battery;
    a measurement unit that measures a characteristic of the battery provided;
    an identification unit that identifies a type of the battery based on the measured characteristic of the battery; and
    a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle; wherein
    the identification unit identifies the type of the battery in a case where replacement of the battery is detected, and even in a case where the stored content in the memory is initialized, the identification unit determines that the battery has not been replaced in a case where the characteristic of the battery remains unchanged even after the initialization.

3. A vehicle having an idle stop function, comprising:
a battery;
a volatile memory in which a stored content is retained using the battery;
a measurement unit that measures a characteristic of the battery;
an identification unit that identifies a type of the battery based on the measured characteristic; and
a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle wherein
the identification unit identifies the type of the battery in a case where replacement of the battery is detected, and
even in a case where the stored content in the memory is not initialized, the identification unit determines that the battery has been replaced in a case where the characteristic of the battery is changed during a predetermined time period.

4. A control method for controlling a vehicle having an idle stop function controlled by a control apparatus, the control apparatus includes a volatile memory in which a stored content is retained using a battery provided in the vehicle, comprising:
measuring a characteristic of a battery provided in the vehicle;
identifying a type of the battery based on the measured characteristic;
stopping the idle stop function in a case where the identified type of the battery indicates that the battery is not for an idle-stop vehicle; and
permitting execution of the idle stop function in a case where the execution of the idle stop function is permitted by an input of a predetermined signal from an external terminal even when the identified type of the battery indicates that the battery is not for the idle-stop vehicle,
identifying the type of the battery in a case where replacement of the battery is detected when identifying the type of the battery based on the measured characteristic; and
determining, even in a case where the stored content in the memory is not initialized, that the battery has been replaced in a case where the characteristic of the battery is changed during a predetermined time period, when identifying the type of the battery based on the measured characteristic.

5. A vehicle having an idle stop function, comprising:
a battery;
a volatile memory in which a stored content is retained using the battery;
a measurement unit that measures a characteristic of the battery;
an identification unit that identifies a type of the battery based on the measured characteristic; and
a control unit that stops the idle stop function in a case where the identified type of the battery indicates that the battery is not for an idle-stop vehicle, and permits execution of the idle stop function in a case where the execution of the idle stop function is permitted by an input of a predetermined signal from an external terminal even when the identified type of the battery indicates that the battery is not for the idle-stop vehicle, wherein
the identification unit identifies the type of the battery in a case where replacement of the battery is detected, and
even in a case where the stored content in the memory is initialized, the identification unit determines that the battery has not been replaced in a case where the characteristic of the battery remains unchanged even after the initialization.

6. A control method for controlling a vehicle having an idle stop function controlled by a control apparatus, the control apparatus includes a volatile memory in which a stored content is retained using a battery provided in the vehicle, comprising:
Measuring a characteristic of a battery provided in the vehicle;
Identifying a type of the battery based on the measured characteristic;
Stopping the idle stop function in a case where the identified type of the battery indicates that the battery is not for an idle-stop vehicle; and
Permitting execution of the idle stop function in a case where the execution of the idle stop function is permitted by an input of a predetermined signal from an external terminal even when the identified type of the battery indicates that the battery is not for the idle-stop vehicle;
Identifying the type of the battery in a case where replacement of the battery is detected when identifying the type of the battery based on the measured characteristic; and
Determining, even in a case where the stored content in the memory is initialized, that the battery has not been replaced in a case where the characteristic of the battery remains unchanged even after the initialization, when identifying the type of the battery based on the measured characteristic.

* * * * *